Dec. 4, 1962           D. G. FINK           3,067,297
APPARATUS FOR DETERMINING THE POLARITIES OF STEREOPHONIC
CHANNEL CONNECTIONS AT ANY SELECTED POINT
Filed Feb. 26, 1960

INVENTOR.
DONALD G. FINK
BY
Fordyce A. Bothwell
ATTORNEY

United States Patent Office 3,067,297
Patented Dec. 4, 1962

3,067,297
APPARATUS FOR DETERMINING THE POLARI-
TIES OF STEREOPHONIC CHANNEL CONNEC-
TIONS AT ANY SELECTED POINT
Donald G. Fink, Meadowbrook, Pa., assignor to Philco
Corporation, Philadelphia, Pa., a corporation of Delaware
Filed Feb. 26, 1960, Ser. No. 11,293
7 Claims. (Cl. 179—175)

This invention relates to stereophonic systems and more particularly to the determination of relative polarities of the signals at any point in such a system.

In any stereophonic system, whether it be a broadcast system or simply a record playing system as in a home, it is necessary for correct stereophonic reproduction that the acoustic membranes or diaphragms of the sound reproducers or loud speakers shall move in the same direction at any given instant, as otherwise cancellation effects will occur between the acoustic outputs resulting in poor low-frequency response. In a broadcast system, therefore, it is important that the stereophonic audio signals be transmitted in like phase. However, phase reversal may occur for various reasons. For example, when there is a change-over from one program originating at one location to another program originating at another location, phase reversal may occur and may cause the transmitted audio signals to be opposite in phase. As another example, where a complex network of telephone lines is interposed between the source of the stereophonic audio signals and the broadcast stations which transmit the signals, phase reversals may occur within such network and may cause the transmitted signals to be opposite in phase. Moreover, it is often not feasible to trace the relative polarities through such a complex network.

With respect to the stereophonic sound reproduction in any instance, it is necessary of course for correct reproduction that the sound reproducers or loud speakers be connected in proper polarity so that their diaphragms will be driven in the same direction at any given instant when identically phased signals are supplied to them.

For the foregoing reasons, there has existed a need for some relatively simple method of determining the relative polarities of the signals at whatever point desired in a stereophonic system, in order to insure that the ensuing apparatus is properly connected according to the relative polarities of the signals at that point.

The principal object of the present invention is to provide a simple apparatus which enables such determination.

This invention is based on the concept that the relative polarities of the signals at any point in a stereophonic system may be determined by passing through the channels of the system a polarity-indicative signal and by deriving said signal from each channel at the point where the determination is to be made. More particularly, the invention contemplates the passage through the system of a test signal having a waveform comprising alternate relatively narrow and broad portions of opposite polarity with respect to the wave axis, which portions are readily distinguishable and enable the polarity determination as hereinafter described.

In the case of a broadcasting system, the test signal may be transmitted prior to the commencement of a program from the point of origin of the stereophonic audio signals about to be transmitted, and the relative polarity determination may be made at an appropriate point to insure that the transmitted signals will be of like phase. However, it will be understood that the test signal may be derived at any point in the system to make the relative polarity determination at that point.

An alternative procedure would be to transmit continuously a test signal having a frequency below audibility, which could be derived at any point to make the relative polarity determination.

In some instances it may be desired to determine the proper polarity of the connections of loud speakers without the aid of a broadcast test signal. This may be done simply by passing a test signal through the stereophonic channels leading to the loud speakers. For example, in the case of a stereophonic receiver the test signal may be passed through the audio portions of the channels, and in the case of a phonograph system the test signal may be passed through the channels from the inputs.

The invention may be fully understood from the following detailed description with reference to the accompanying drawing wherein.

Figure 1:
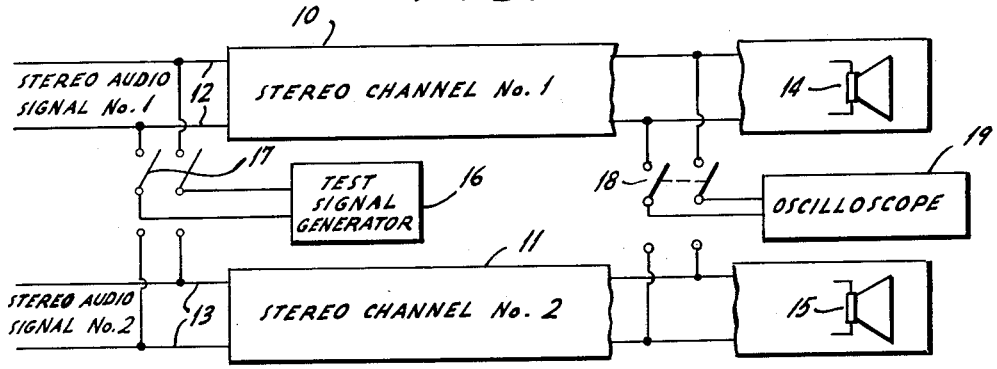
FIG. 1 is a block diagram of an arrangement according to the present invention employing an oscilloscope as an indicator means.

Referring first to FIG. 1, there is represented for the purpose of illustration a simple two-channel stereophonic arrangement wherein the two channels are represented at 10 and 11. These are intended to represent any two stereophonic channels to which two stereophonic audio signals are supplied via the input connections 12 and 13, and which terminate at the loudspeakers 14 and 15. For example, the two channels may be taken to represent an entire stereophonic broadcasting system from the sound sources to the sound reproducers, or they may be taken to represent a phonograph system or the audio channels of a receiver.

In accordance with this invention provision is made for applying a test signal to the inputs of the two channels. To this end, there are provided a test signal generator 16 and switch means 17, shown as a double-pole double-throw switch, by which the test signal may be supplied at will to the input of each channel. Also in accordance with this invention, provision is made for deriving the test signal from each channel at a desired test point and for supplying the derived test signal to indicator means. Thus in the arrangement of FIG. 1 selector switch means 18, shown as a double-pole double-throw switch, is connected to the two channels and to an oscilloscope 19.

Figure 2:
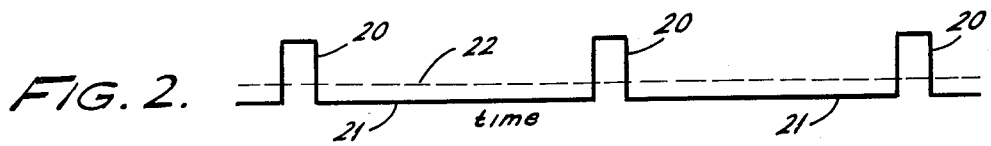
FIG. 2 shows the preferred form of the test signal as it is applied to each channel.

Referring now to FIG. 2, the test signal preferably is of the form shown having relatively narrow portions 20 and relatively broad portions 21 which are of opposite polarity with respect to a D.C. axis represented by the broken line 22. With this waveform, the narrow portions are indicative of one polarity, e.g. positive as shown, and the broad portions are indicative of the other polarity. Furthermore the signal is adapted to the low and high frequency responses of the system. Basically, the test signal shown is an unsymmetrical square wave whose duty cycle corresponds to the low frequency response of the system. Such a wave can be readily generated, e.g. by means of an unsymmetrical multivibrator.

Where the stereophonic system involves carrier transmission of the audio signals, as in over-the-air transmission, and it is desired to similarly transmit the test signal, the latter may be modulated on a carrier and may be recovered at the receiver by detection.

Figure 3:
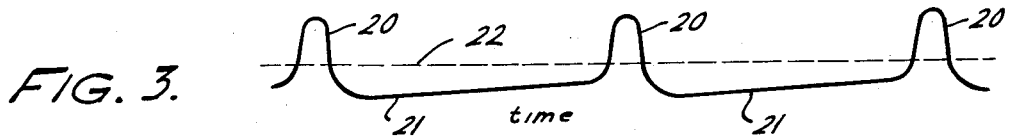
FIG. 3 illustrates the distortion that occurs in the test signal due to its transmission through each of the channels.

When a signal wave such as shown in FIG. 2 is transmitted through an audio system, it becomes distorted as shown in FIG. 3, but the relatively narrow and relatively broad portions are still readily distinguishable from one another. When such a wave is displayed, for example on a cathode-ray oscilloscope, the upward direction can be identified and this direction associated with the polarity of the wires carrying the audio signal. By feeding the same test signal to a plurality of pairs of wires, and connecting each pair in turn to the oscilloscope, it is possible to associate the upward direction with one wire of each pair, and thus assure that each pair of wires is connected to the ensuing apparatus in the correct relative phase. Thus with similar connections of the oscilloscope to the two channels, if the observed test signal is the same for both channels there has been no reversal of the relative polarities, but if the observed test signal shows opposite polarities the connections to ensuing apparatus in one channel should be reversed.

In FIG. 1, for example, suppose that switch 17 is closed in the upper position and switch 18 is closed in the upper position. The test signal is supplied to the input of channel 10 and is derived at the test point and applied to the oscilloscope 19 on which the displayed wave is observed. Then the switches 17 and 18 are thrown to the lower position, so that the test signal applied to channel 11 is derived therefrom and observed on the oscilloscope. In this way it is possible to determine the relative polarities of the connections of each channel to insure that the ensuing apparatus is connected in proper phase.

Figure 4:
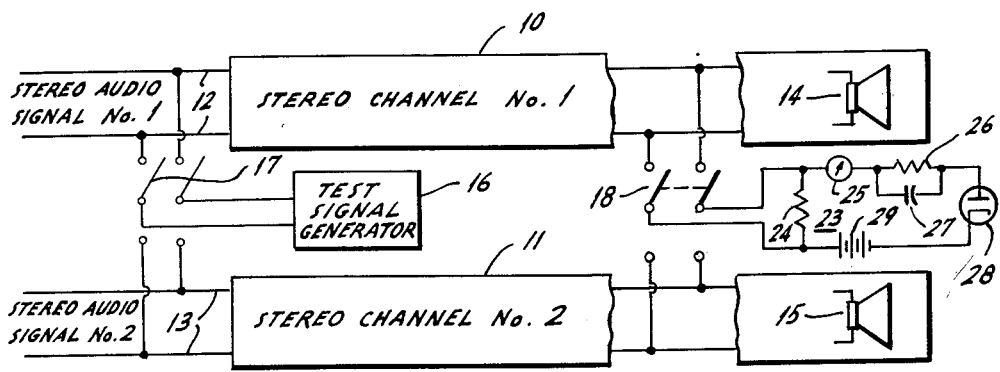
FIG. 4 is a block diagram of an arrangement similar to that of FIG. 1 but employing indicator means including a biased peak detector.

Referring now to FIG. 4, the system there shown is similar to that of FIG. 1 but employs a different form of indicator means. In this instance the test signal derived by way of switch 18 is supplied to an indicator circuit 23 including a biased peak detector. The indicator circuit comprises the shunt resistor 24, a milliammeter 25, a resistor-capacitor combination 26—27, detector diode 28 and biasing source 29.

In this instance the positive and negative polarities of the test signal are indicated by high and low readings on the meter 25. That is to say, the reading of the meter will be higher when the derived test signal is of one polarity than when the test signal is of the opposite polarity.

While in the illustrated embodiments a single indicator is switched from one channel to the other, it will be apparent that two indicators could be connected to the respective channels to display the derived test signal.

Thus, while certain embodiments of the invention have been illustrated and described, it will be understood that the invention is not limited thereto but contemplates such modifications and further embodiments as may occur to those skilled in the art.

I claim:
1. Apparatus for determining at a desired point the relative polarities of signals transmitted through stereophonic signal channels, comprising means for supplying to each of said channels a polarity indicative test signal having different portions of opposite polarity which are readily distinguishable, means for deriving the test signal from each of said channels at the test point, indicator means, and means for supplying the derived test signals to said indicator means.

2. Apparatus for determining at a desired point the relative polarities of signals transmitted through stereophonic signal channels, comprising means for supplying to each of said channels a polarity-indicative test signal wave having alternate narrow and broad portions of opposite polarity with respect to the wave axis, and means for deriving the test signal from each of said channels at the test point.

3. Apparatus for determining at a desired point the relative polarities of signals transmitted through stereophonic signal channels, comprising means for supplying to each of said channels a test signal wave having alternate narrow and broad portions of opposite polarities with respect to the wave axis, means for deriving the test signal from each of said channels at the test point, indicator means, and means for supplying the derived test signals to said indicator means.

4. Apparatus according to claim 3, including means for applying to each of said channels an unsymmetrical square wave.

5. Apparatus according to claim 3, wherein said indicator means is an oscilloscope.

6. Apparatus according to claim 3, wherein said indicator means includes a biased peak detector.

7. Apparatus for determining at a desired point the relative polarities of signals transmitted through stereophonic signal channels, comprising means for generating a test signal wave having alternate narrow and broad portions of opposite polarities with respect to the wave axis, means for supplying the test signal to each of said channels, means for successively deriving the test signal from said channels at the test point, indicator means, and selector switch means for successively supplying to said indicator means the test signal successively derived from said channels.

References Cited in the file of this patent
UNITED STATES PATENTS

| | | |
|---|---|---|
| 2,538,869 | Holst | Jan. 23, 1951 |
| 2,607,035 | Levine | Aug. 12, 1952 |